United States Patent
Lawson

(12) 
(10) Patent No.: US 6,494,270 B1
(45) Date of Patent: Dec. 17, 2002

(54) APPARATUS AND METHOD FOR MULCHING AND CULTIVATING AGRICULTURAL FIELDS

(75) Inventor: Marcus G. Lawson, Kissimmee, FL (US)

(73) Assignee: Lawson Cattle & Equipment, Inc., Kissimmee, FL (US)

( * ) Notice: Subject to any disclaimer, the term of this patent is extended or adjusted under 35 U.S.C. 154(b) by 0 days.

(21) Appl. No.: 09/636,364

(22) Filed: Aug. 11, 2000

Related U.S. Application Data

(60) Provisional application No. 60/148,785, filed on Aug. 13, 1999.

(51) Int. Cl.[7] .............................................. A01B 21/04
(52) U.S. Cl. ........................ 172/554; 172/518; 172/540
(58) Field of Search ......................... 172/21, 174, 176, 172/177, 240, 322, 452, 518, 540, 542, 548, 44, 556, 22, 118, 119, 122, 170, 172, 545, 554

(56) References Cited

U.S. PATENT DOCUMENTS

| | | | |
|---|---|---|---|
| 2,659,188 A | | 11/1953 | Haban |
| 2,663,131 A | * | 12/1953 | Johnson ........................ 172/554 |
| 2,870,850 A | * | 1/1959 | Dethlefsen .................. 172/554 |
| 3,193,021 A | * | 7/1965 | Lane ............................ 172/44 |
| 3,538,987 A | | 11/1970 | Taylor |
| 3,750,758 A | | 8/1973 | Bancel |
| 3,794,123 A | * | 2/1974 | Whitesides ................. 172/624 |
| 3,860,075 A | * | 1/1975 | Morris ......................... 172/44 |
| 4,044,841 A | | 8/1977 | Smith et al. |
| 4,260,027 A | | 4/1981 | Langan |
| 4,508,177 A | * | 4/1985 | Wiser ......................... 172/177 |
| 4,518,043 A | | 5/1985 | Anderson et al. |
| 4,619,329 A | * | 10/1986 | Gorbett ....................... 172/21 |
| 4,690,224 A | | 9/1987 | Shwez |
| 5,267,517 A | * | 12/1993 | Jones ......................... 172/548 |
| 5,316,088 A | * | 5/1994 | Ries .......................... 172/510 |
| 5,318,134 A | * | 6/1994 | Jensen ........................ 172/44 |
| 5,474,135 A | * | 12/1995 | Schlagel .................... 172/151 |

FOREIGN PATENT DOCUMENTS

| | | | |
|---|---|---|---|
| JP | | 4316401 | * 11/1992 |
| WO | WO 93/09659 | | * 5/1993 |

OTHER PUBLICATIONS

Lawson, *Lawson Cattle & Equipment Inc.: The Finest in Pasture Aeration and Brush Clearing*, USA, 1995.

* cited by examiner

Primary Examiner—Thomas B. Will
Assistant Examiner—Nathan Mammen
(74) Attorney, Agent, or Firm—Allen, Dyer, Doppelt, Milbrath & Gilchrist, P.A.

(57) ABSTRACT

An agricultural machine for effectively mulching fodder within the space between crop rows with a single pass includes a frame having an adjustable tongue assembly for towing by a tractor at a preselected pitch and a retractable wheel assembly for transporting the machine over roads. Carriages attached to the frame carry freely rotating drums. Each carriage is slidable and rotatable on the frame for securing the carriage at a preselected orientation. Each drum has a rolling surface for engaging the ground being cultivated. Two carriages form a drum pair which straddles the crop row for permitting the drums within the drum pair to freely roll over ground on opposing sides of the crop row. A plurality of blades is carried on each of the rolling surfaces of the drums for penetrating the ground surface, with the blades extends radially outward from the axis of rotation. Each blade includes a cutting edge oriented with the blades on one drum orthogonal to the blades an the second drum of the drum pair. Multiple drum pairs may be carried by the frame. By rolling the drums on the ground surface, the plurality of blades mulch the fodder between crop rows and shape the crop row being straddled with ground material thrown by the rotating blades. The pitching of the frame and adding of water to the drums further enhances the mulching and cultivating.

45 Claims, 5 Drawing Sheets

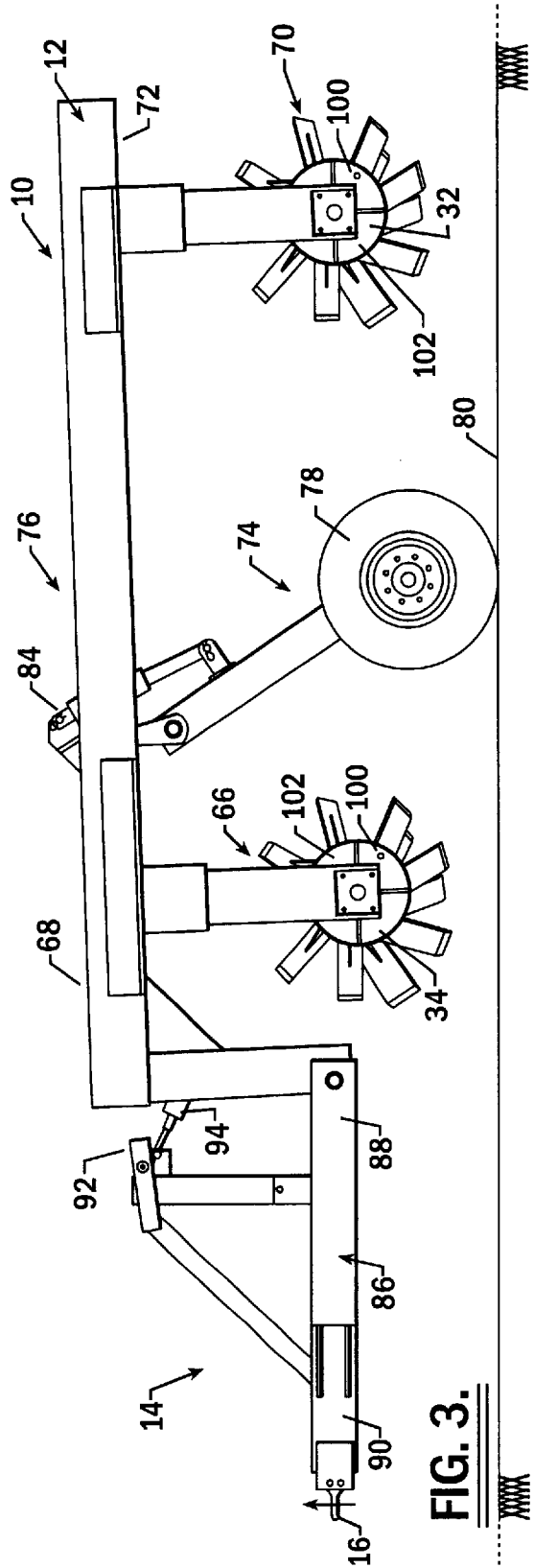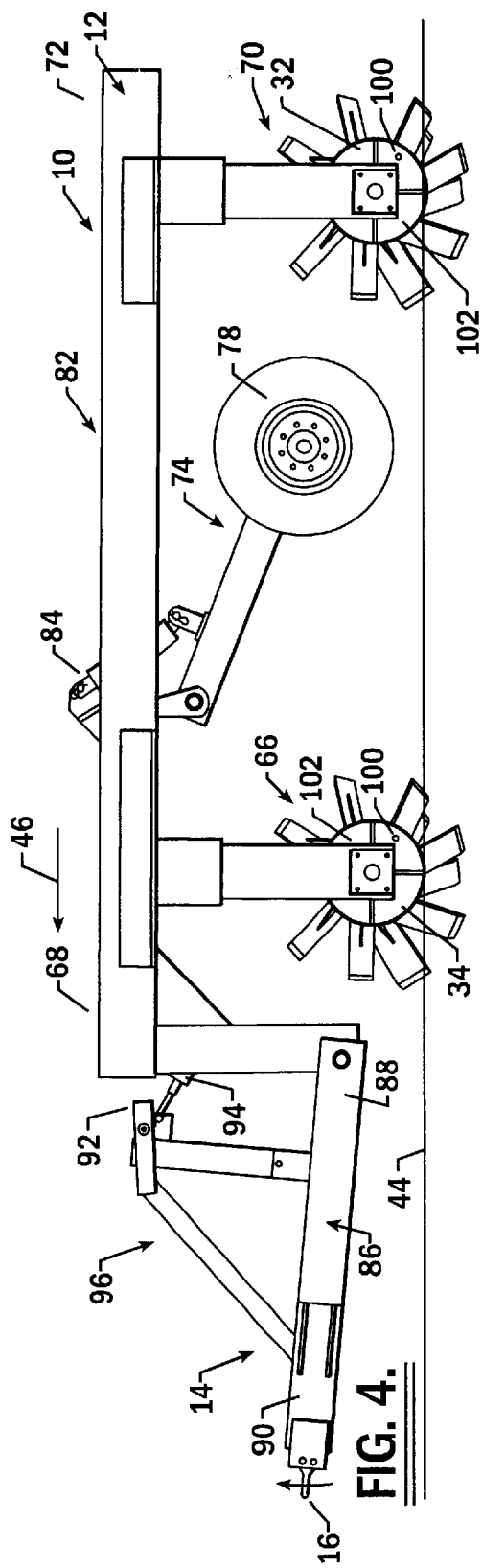

APPARATUS AND METHOD FOR MULCHING AND CULTIVATING AGRICULTURAL FIELDS

CROSS REFERENCE TO RELATED APPLICATION

This application incorporates by reference and claims priority to Provisional Application Ser. No. 60/148,785 for "SUGAR CANE MULCHING APPARATUS" having a filing date of Aug. 13, 1999, and which is commonly owned with this application.

FIELD OF THE INVENTION

The present invention relates to agricultural machines and operations, and in particular to a ground driven apparatus and method for mulching fodder remaining within valley portions of an agricultural bed as in a sugar cane field which has had sugar cane cut and harvested.

BACKGROUND

The preparation of crop rows for planting after one crop has been harvested has been an ongoing task for the agricultural ages. As described with reference to U.S. Pat. No. 4,690,224 to Shwez, it is well known that the residue of one crop must be disposed of in some manner before seedbed preparation can begin for the next crop. Shwez discloses an agricultural implement that cuts and shreds the stalks of plants by bending and pressing the stalks onto the ground and subsequently shredding them with swinging motor driven, hinged cutter blades. Cultivating the unplanted soil between crop rows to control weed growth, to mulch, and to aerate the soil is desirable for optimum plant growth, as described in U.S. Pat. No. 4,518,043 to Anderson et al., which discloses a power driven outrigger for driving a working tool to cultivate the soil through a circular stirring motion. A variety of implements and techniques are typically employed and may include, by way of example, using radially driven, rotating knife cutters and shredders, flail type stalk shredders, as well as stalk and root extracting and shredding. By way of further example, U.S. Pat. No. 4,044,841 discloses a rotary tiller having counter rotated rotors driven for chopping vegetation. Yet other techniques, like that disclosed in U.S. Pat. No. 2,659,188, operate to scoop up residue for chopping or mowing.

In spite of the many implements and method know in the art for mulching and cultivating the ground between crop rows, discing appears to remain the most popular. However, as inexpensive as a disc may be relative to other power driven mulching machines, it typically takes up to eleven passes, by way of example for a sugar cane field, along a crop row to adequately mulch and cultivate the soil. There is a need to mulch and cultivate such agricultural fields as sugar cane fields in a cost effective and straight forward manner, preferably within a single pass regardless of the soil type.

SUMMARY OF INVENTION

In view of the foregoing background, it is therefore an object of the present invention to mulch fodder within and cultivate an interspace between crop rows with a single pass over one crop row. It is further an object to fracture the ground within the interspace for enhancing underground lateral water flow and aeration.

These and other objects, advantages and features of the present invention are provided by an apparatus comprising a frame adapted for moving across an agricultural field and at least two drums rotatably carried by the frame. Each of the drums is freely rotatable about an axis of rotation, and each includes a rolling surface for operating on a ground surface above which the frame is moving. A plurality of blades extends outward from the rolling surface for penetrating the ground surface. Each of the plurality of blades has an edge in spaced relation to the rolling surface and is oriented at an angle between zero degrees and ninety degrees to the axis of rotation. One of the at least two drums includes the plurality of blades having one angle which differs from the angle for the plurality of blades of a second of the at least two drums. One embodiment of the apparatus includes the at least two drums, in combination, forming a drum pair, with one drum pair carried at a forward portion of the frame and a second drum pair carried at an aft portion of the frame. The weight of the frame and drums are generally sufficient to allow the blades to penetrate the ground with the rolling surface of the drum freely rolling on the ground surface. With extremely hard or compact soils, the drums may be filled with water for adding weight to the apparatus.

A method aspect of the invention comprises freely rotating first and second drums about their respective axis of rotation, wherein each of the first and second drums includes a rolling surface for operating over a ground surface and a plurality of blades extending from the rolling surface for penetrating the ground surface. The first drum has the blades angled orthogonal to the blades on the second drum. The first and second drums are straddled transversely across and proximate the crop row for permitting the first and second drums to freely roll on opposing sides of the crop row. The drums are then freely rolled over the ground surface for having the plurality of blades to mulch within opposing ground portions on each side of the crop row.

BRIEF DESCRIPTION OF THE DRAWINGS

A preferred embodiment of the invention, as well as alternate embodiments are described by way of example with reference to the accompanying drawings in which:

FIG. 3 is a side view of the embodiment of FIG. 1, illustrating a transportation wheel assembly in a transporting position;

FIG. 4 is the side view of FIG. 3, illustrating a retracted transportation wheel assembly during use of the apparatus in a mulching and cultivating operation with a tongue assembly positioned for a weight biasing onto a rear drum pair;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
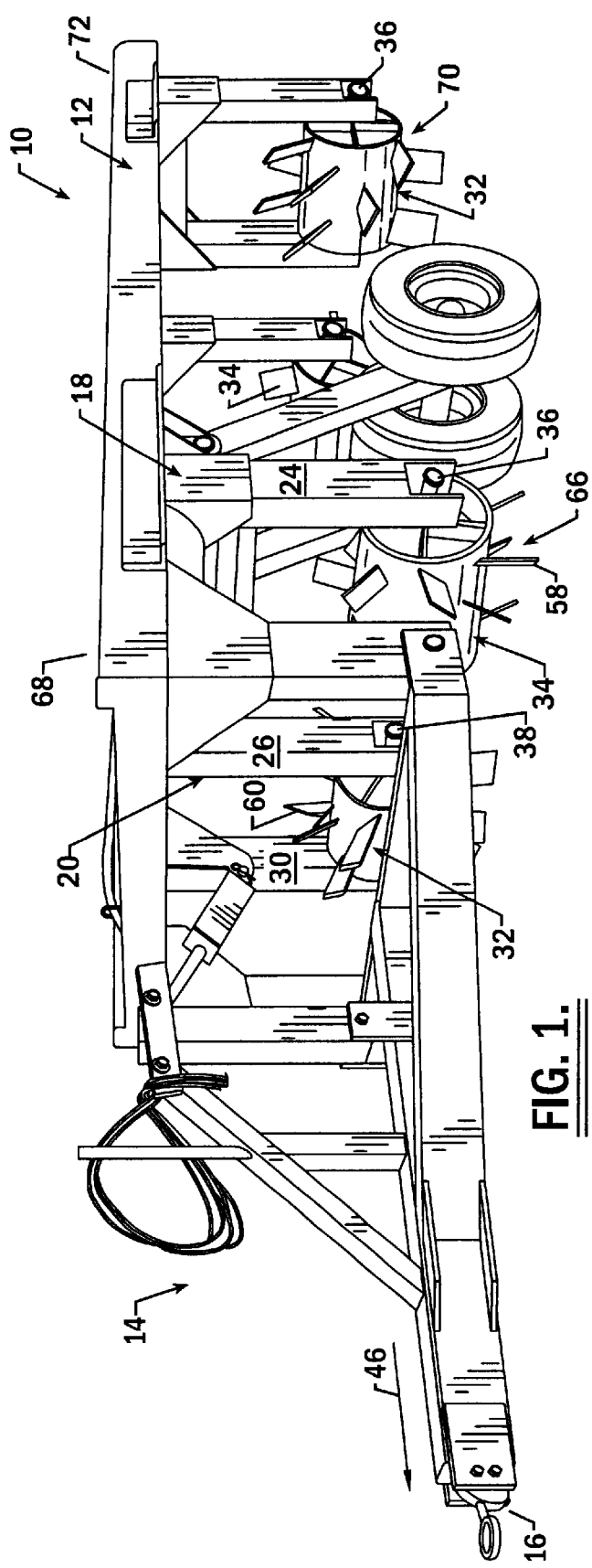
FIG. 1 is a right front perspective view of one embodiment for a mulching and cultivating apparatus in accordance with the present invention.

Referring initially to FIG. 1, one embodiment of a mulching and cultivating apparatus 10 according to the invention is first described. The apparatus 10 comprises a frame 12 and a tongue assembly 14 which provides means for attaching the frame to a tractor, by way of example, using a tractor hitch 16. The apparatus 10 herein described by way of example, is adapted to be pulled by the tractor but as will become clear to one skilled in the art, alternate driving means including harvesting type self driven vehicles, or a vehicle adapted to push the apparatus 10 may also be used, in addition to a self propelled version without departing from the intent and teachings of the present invention. With continued reference to FIG. 1, the apparatus 10 further includes a first carriage 18 and a second carriage 20 moveably carried by the frame 12 for affixing thereto at a preselected orientation 22.

Figure 2:
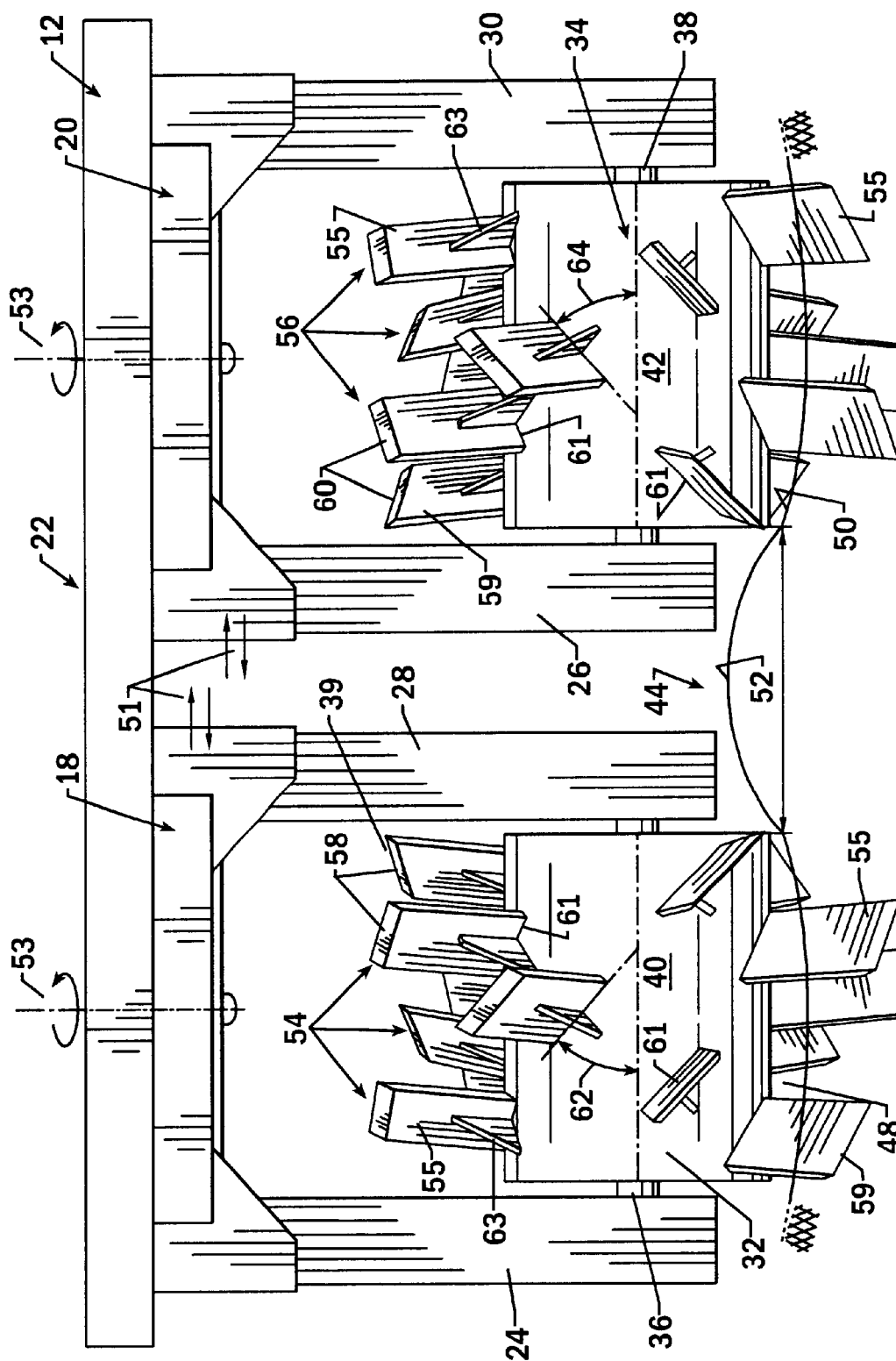
FIG. 2 is a rear elevation view of a rotating drum pair of the embodiment of FIG. 1, the front being a mirror image.

As illustrated with reference to FIG. 2, each of the first and second carriages 18, 20 have first and second arms, 24, 26, and 28, 30, respectively, in a spaced relation for receiving a drum 32, 34 therebetween. The first drum 32 and the second drum 34, carried by the first and second carriages 18, 20, respectively, are each freely rotatable on first and second axles 36, 38 extending between the first and second arms 24, 26 and 28, 30 of each carriage. In one embodiment of the present invention, herein described by way of example, the drums 32, 34 are cylindrical in shape and define a rolling surface 40, 42 for preferably operating on a ground surface 44 above which the frame 12 is moving. As illustrated by way of example with reference again to FIGS. 1 and 2, the first carriage 18 is spaced from the second carriage 20 and carried by the frame 12 generally transverse to a direction of travel 46 for the frame, thus permitting the drums 32, 34 to freely roll in contact with the ground surface 44 on opposing interspace sides, or valley portions 48, 50 of a crop row 52, as illustrated again with reference to FIG. 2. The shape of the crop row 52 and interspace ground 48, 50 are herein described for discussion only and are not intended to be exact. The first and second carriage 18, 20 are slidably as shown by arrows 51 and rotatably as shown by arrows 53 carried by the frame 12 for securing each carriage 18, 20 and thus each drum 32, 34 at the preselected orientation 22 desired for mulching and cultivating the ground surface 44 within the valley portions 48, 50.

With reference again to FIGS. 1 and 2, each drum 32, 34 includes a plurality of blades 54, 56 carried on the rolling surface 40, 42, respectively. In one embodiment of the invention, as herein described by way of example, each of the plurality of blades 54, 56 extends radially outward from the axle 36, 38 and includes a cutting edge 58, 60 oriented at first and second non-zero angles 62, 64 to the respective axle (axes of rotation). In one preferred embodiment, the first non-zero angle 62 for the first drum 32 differs from the second non-zero angle 64 of the second drum 34, placing the blades 54 of the first drum orthogonal to the blades 56 on the second drum. In addition, operation of the apparatus 10 in sugar cane fields, by way of example, has shown that angles ranging from 40 degrees to 50 degrees, although not required for operation, have been effective for the first and second non-zero angles 62, 64. With reference again to FIG. 2, for the embodiment of the invention herein described, the blades 54, 56 are formed from a plate 55 having a tapered cutting edge 59 for penetrating the ground surface 44 and an opposing edge 61 welded to the rolling surface 40, 42 of each drum 32, 34. A gusset 63 welded to the plate 55 and the rolling surface 40, 42 provides added strength and stiffness to the plate and the attachment of the plate to the rolling surface.

As illustrated with reference again to FIG. 1, one embodiment of the present invention includes the first and second carriages 18, 20 and drums 32, 34, in combination, forming a drum pair, with the apparatus 10 including one drum pair 66 carried at a forward portion 68 of the frame 12 and a second drum pair 70 carried at an aft portion 72 of the frame. In one preferred embodiment of the invention as herein described, the one drum pair 66 and the second drum pair 70 have their respective drums 32, 34 within one valley portion 48, by way of example, and include blades 54, 56 that are orthogonal to each other. By way of further illustration, the first drum 32 of the first drum pair 66 rolls within the same valley portion 48 as the second drum 34 of the second drum pair 70 allowing the blades of the first drum pair to throw ground material to the left and the blades of the second drum pair to throw ground material to the right, by way of example.

With reference again to FIG. 1 and to FIGS. 3 and 4, the apparatus 10 further comprises a wheel assembly 74 rotatably carried by the frame 12 for movement of the wheel assembly from a transporting position 76, wherein a wheel 78 carried by the wheel assemble contacts a roadway 80 for transporting the apparatus thereover with the cutting edges 58, 60 of the blades 54, 56 out of contact with the roadway, to a retracted position 82, wherein the wheel 78 is positioned for allowing the blades 54, 56 to be placed in contact with the ground surface 44 being cultivated. In one embodiment of the apparatus 10, a tandem wheel assembly having multiple wheels is employed with a hydraulic drive mechanism 84 operable with the wheel assembly 74 for providing movement thereto.

As illustrated with reference again to FIGS. 1, 3 and 4, the tongue assembly 14 provides means for attaching the frame 12 to a tractor for pulling the apparatus 10. In addition, the tongue assembly 14 is pivotal with respect to the frame 12 for providing a shift in the center of gravity between the forward to the aft portions 68, 72 as desired, thus allowing a preselected load onto the ground surface 44 for the one drum pair 66 and the second drum pair 70. For permitting such a weight shift, the tongue assembly 14 includes an elongate member 86 having a proximal end 88 pivotally attached to the frame 12 and a distal end 90 having the tractor hitch 16 adapted to be connected to the tractor. A telescoping arm 92 is pivotally connected between the elongate member 86 and the frame 12, wherein a preselected telescoping length adjustment of the arm 92 causes the frame to be set at a desired pitch ranging between a forward pitch to an aft pitch, and thus a biasing of weight distribution through the movement of the center of gravity. A second hydraulic drive mechanism 94 is used to provide telescoping length adjustments.

Figure 5:
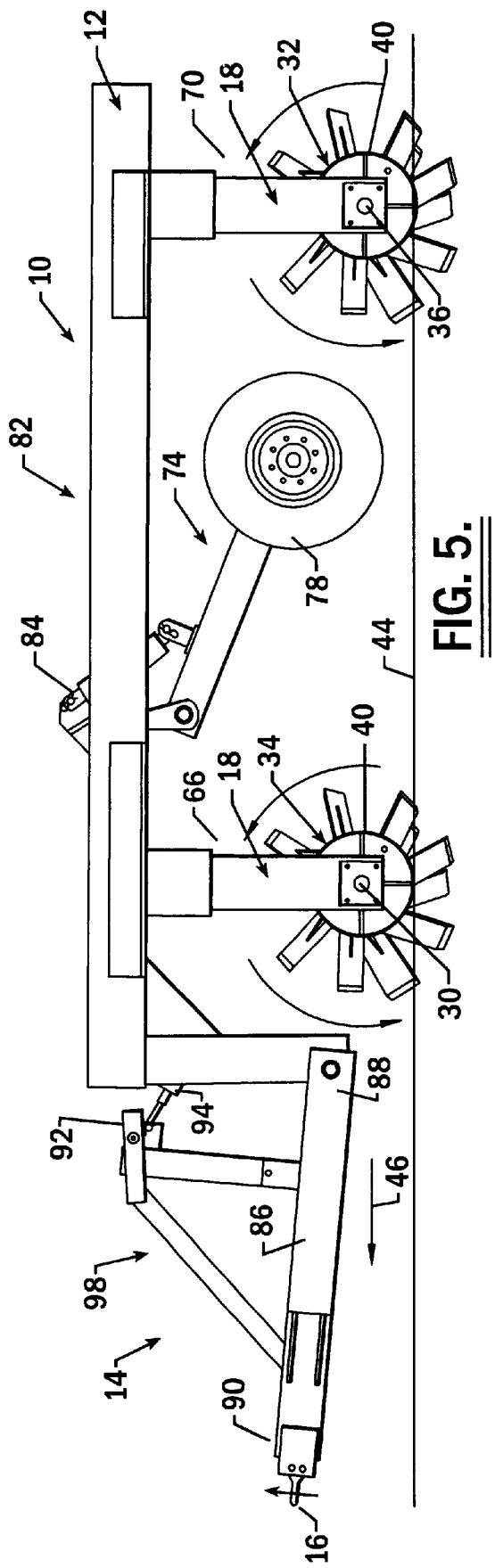
FIG. 5 is the side view of FIG. 3, illustrating a retracted transportation wheel assembly during use of the apparatus in a mulching and cultivating operation with a tongue assembly positioned for a weight biasing onto a front drum pair.

By way of example, the one adjustment 96 of the tongue assembly 14 illustrated with reference again to FIG. 4 provides a biasing toward the aft portion 72 of the frame 12 with more load provided by the second drum pair 70, while the second adjustment 98 illustrated with reference to FIG. 5 provides an generally evenly biased weight distribution onto the forward and aft drum pairs 66, 70. In one preferred embodiment of the invention, each drum 32, 34 is a hollow cylinder having a chamber which is filled with water through a bung 100 in a side wall 102 of the drum 32, 34 when added weight is desired for the apparatus 10 operating in extremely compacted soil. It is desirable that the drums 32, 34 of the one drum pair 66 and the second drum pair 70 have their rolling surface 40, 42 roll on the ground surface 44 to permit full penetration of the blades 54, 56. Adding weight to the apparatus 10 by carrying water within the drums 32, 34 allows the blades to penetrate more compacted soils.

Figure 6:
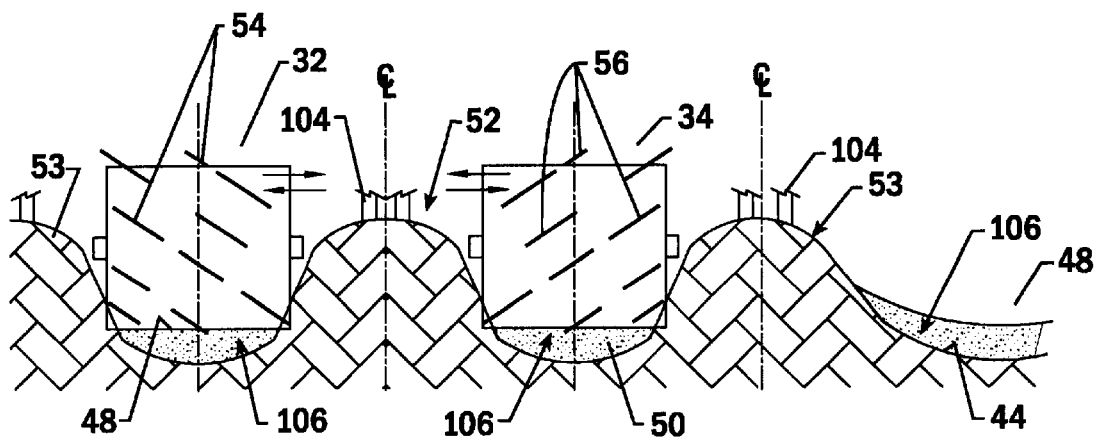
FIG. 6 is a cross-section view of an agricultural field illustrating, by way of example, crop rows of a sugar can bed and space between crop rows typically containing cut cane stems after a sugar cane harvesting.
Figure 7:
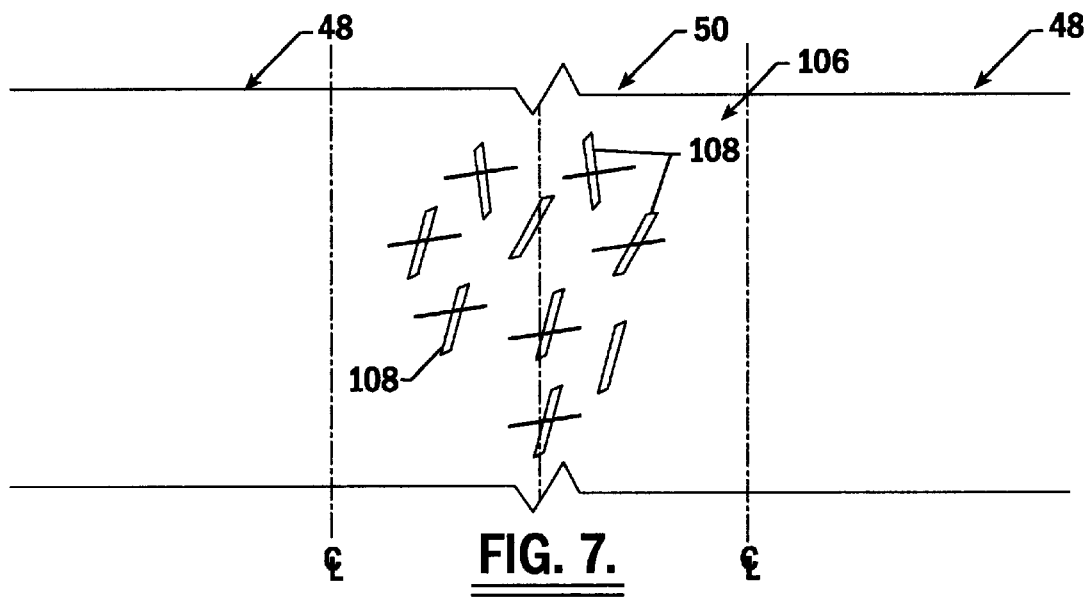
FIG. 7 is a partial illustrative plan view of a sugar cane bed illustrating a crop row and bed middles/valley portions, thereof.

In operation, and as illustrated with reference to FIGS. 6 and 7, a method of mulching and cultivating the valley portions 48, 50 of crop rows 52, 53 where sugar cane 104 has been cut and harvested resulting in the fodder 106 including cane stalks 108 undesirably dispersed over the valley portions on the opposing sides 48, 50 as earlier described with reference to FIG. 2, includes freely rotating the drums 32, 34 for operating over the valley portions 48, 50 and causing the plurality of blades 54, 56, orthogonally carried within a single valley portion 48, 50 as earlier described, to penetrate the ground surface 44 cutting the cane stalks 108 and mulching the ground material/soil within the valley portions 48, 50. By having each of the plurality of blades 54 on the first drum 32 orthogonal to the plurality of blades 56 on the second drum 34, portions of the soil within the valley portions 48, 50 are thrown in one direction away from the crop row 52 and portions of the soil thrown toward the crop row 52. In addition, by straddling the crop row 52 with both the one drum pair 66 and the second drum pair 70, and having the blades 54, 56 carried by the drums 32, 34 of the one drum pair arranged in a mirror image to the blades carried by the second drum pair, one drum pair 66 will throw portions of the ground material including fodder to the left, while the other drum pair 70 will throw ground material to the right, by way of example.

Yet further, the carriages 18, 20 may be rotated at an acute angle to the direction of travel 46 along the crop row 52 and fixed at the acute angle to further angle the blades and enhance the cultivating by having the blades be more or less aggressive in throwing the dirt during the free rotation of the drums 32, 34.

Operation of the apparatus 10 herein described has shown that the fodder 106 is cut into small pieces which encourages a large percentage to rot. The blades 54, 56 penetrate depths into the ground 44 that fractures a full width of the valley portions 48, 50 or middle between the crop row 52, thus avoiding standing water, permitting fertilizer to seep in, and water to seep in, all encouraging roots to desirably grow downward toward the water and nutrients instead of growing into only the first few inches of soil. Use of the embodiment of the present invention herein described has eliminated the need to disk cane fields upwards of eight to eleven passes in order to adequately cut-up fodder and then have to chisel plow the field. The apparatus avoids fodder balling up, enables mulching to a desired level within a single pass, provides a wider soil fracture zone than typically seen using the discing method, fracturing 18" to 24" deep into the ground using ten inch long blades. The apparatus herein described has resulted in a consistent leveling and fracturing for a full width of the interspace between sugar cane beds which allows for an even and consistent flow of water during flood irrigation. Fodder is cut and the fodder is mixed into the soil to enhance rotting procedure and build humus in soil. It is to be noted that the apparatus 10 effectively operates at pulling speeds of 7–11 mph making the single pass even more efficient especially when one concedes that disking speeds are generally at 3–5 mph and need up to eleven passes to cultivate the same field. The diameter of the drums and length of blades may be varied to achieve a desired speed of rotation of the drums and ground penetration for the blades.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. An apparatus useful in mulching and cultivating valley portions of an agricultural field, the apparatus comprising:
   a frame having means for attachment to an agricultural traction vehicle adapted for moving the apparatus across an agricultural field;
   a first carriage and a second carriage moveably carried by the frame for affixing thereto at a preselected orientation, each of the first and second carriages having first and second arms in spaced relation for receiving a drum therebetween;
   a first drum and a second drum carried by the first and second carriages, respectively, each drum freely rotatable on an axle extending between the first and second arms of each of the first carriage and the second carriage, each of the first and second drums having a rolling surface for operating with a ground surface above which the frame is moving, wherein the first carriage is in a spaced relation to the second carriage along a direction generally transverse a direction of travel for the frame thus permitting the first and second drums to freely roll over ground at opposing sides of a crop row, and wherein the first and second carriages and drums, in combination, form a drum pair, with one drum pair carried at a forward portion of the frame and a second drum pair carried at an aft portion of the frame;
   a plurality of blades carried on the rolling surface of the drum, wherein each of the plurality of blades extends radially outward from the axle and includes a cutting edge oriented at first and second non-zero angles thereto, and wherein the first non-zero angle carried by the first drum is generally orthogonal to the second non-zero angle carried by the second drum.

2. The apparatus according to claim 1, wherein each of the first and second drums have a chamber for receiving material therein for adding weight thereto.

3. The apparatus according to claim 1, wherein each of the plurality of blades comprises a plate having a tapered cutting edge having a length dimension on one side of the plate greater than a length dimension of an opposing side for penetrating the ground surface.

4. The apparatus according to claim 3, further comprising a gusset fixed attached between the blade and the rolling surface of the drum for enhancing attachment of the blade to the rolling surface.

5. The apparatus according to claim 1, wherein each of the first and second non-zero angles range from approximately 40 degrees to approximately 50 degrees to an axis of rotation of the drum.

6. The apparatus according to claim 1, wherein the first and second carriage are slidably and rotatably carried by the frame for securing each of the first and second carriages thereto at a preselected orientation for dispersing ground material toward a desired direction during rotation of the drums.

7. The apparatus according to claim 1, wherein the means for attachment comprises:
   an elongate member having a proximal end pivotally attached to the frame and a distal end adapted to be rotatably connected to the traction vehicle;

a telescoping arm pivotally connected between the elongate member and the frame, wherein a preselected telescoping length adjustment of the arm causes the frame to set at a desired pitch, the desired pitch ranging between a forward pitch to an aft pitch of the frame.

8. The apparatus according to claim 7, wherein the telescoping arm comprises hydraulic drive means for providing the telescoping length adjustment thereof.

9. The apparatus according to claim 1, further comprising a wheel assembly rotatably carried by the frame for movement of the wheel assembly from a transporting position wherein at least one wheel carried by the wheel assemble contacts the ground surface for transporting the apparatus thereover with the cutting edges out of contact therewith, to a retracted position wherein the at least one wheel is positioned for allowing the blades to be placed in contact with the ground surface.

10. The apparatus according to claim 9, further comprising hydraulic drive means operable with the wheel assembly for providing the movement thereto.

11. The apparatus according to claim 9, wherein the wheel assembly comprises a tandem wheel assembly having multiple wheels carried thereby.

12. An apparatus useful in mulching and cultivating an agricultural field, the apparatus comprising:
- a frame adapted for moving across an agricultural field;
- at least two drums rotatably carried by the frame, each of the at least two drums freely rotatable about an axis of rotation, each of the at least two drums having a rolling surface for engaging a ground surface above which the frame is moving, the at least two drums, in combination, forming a drum pair, wherein one drum pair is carried at a forward portion of the frame and a second drum pair is carried at an aft portion of the frame;
- a plurality of blades extending generally radially outward from the rolling surface, each of the plurality of blades having an edge in spaced relation to the rolling surface oriented at an angle between zero degrees and ninety degrees to the axis of rotation, and wherein one of the at least two drums includes the plurality of blades fixed at one angle which angle is generally orthogonal to the angle of the plurality of blades of another of the at least two drums, the second drum pair including the blades carried on drums therein having a mirror image to the blades carried on the drums of the one drum pair.

13. The apparatus according to claim 12, wherein each of the at least two drums are adapted to be filled with a liquid for adding weight to thereto.

14. The apparatus according to claim 12, wherein each of the plurality of blades comprises a plate having a transversely tapered cutting edge for penetrating the ground surface.

15. The apparatus according to claim 12, wherein each of the at least two drums are slidably and rotatably carried by the frame for securing each thereto at a preselected orientation for rotation about the axis of rotation.

16. The apparatus according to claim 12, further comprising means for orienting the frame at a desired pitch.

17. The apparatus according to claim 12, further comprising a wheel assembly rotatably carried by the frame for movement of the wheel assembly from a transporting position wherein the cutting edges are out of contact with the ground surface, to a retracted position for allowing the at least one of the plurality of blades to be placed in contact with the ground surface.

18. An apparatus useful in mulching and cultivating an agricultural field, the apparatus comprising:
- first and second carriages;
- first and second drums rotatably carried by the first and second carriages, respectively, each of the first and second drums having a rolling surface for freely rolling over a ground surface, wherein the first and second drums and carriages, in combination, form a drum pair, and wherein one drum pair is carried at a forward portion of the frame a second drum pair is carried at an aft portion of the frame;
- a plurality of blades extending outwardly from the rolling surface of each of the first and second drums, wherein each of the plurality of blades includes a cutting edge positioned for penetrating the ground surface, and wherein each of the plurality of blades is fixed at an angle between approximately 40 degrees to approximately 50 degrees to an axis of rotation of the drum for mulching and throwing ground material therefrom during rotation thereof.

19. The apparatus according to claim 18, wherein each of the plurality of blades extends radially outward from the axis of rotation.

20. The apparatus according to claim 18, wherein the first and second drums are carried by the first and second carriages for straddling a crop row.

21. The apparatus according to claim 20, wherein the plurality of blades of the first drum are generally orthogonal to the plurality of blades for the second drum, and wherein the drums are in a spaced relation for shaping a crop row.

22. The apparatus according to claim 18, wherein the first and second drums are carried by the first and second carriages for rolling within a single interspace between adjacent crop rows.

23. The apparatus according to claim 18, wherein each of the first and second carriages is slidably and rotatably adjustable for securing each at a preselected orientation for rotation of the first and second drums about the axis of rotation.

24. The apparatus according to claim 18, further comprising a wheel assembly for movement of the wheel assembly from a transporting position wherein the cutting edges are out of contact with the ground surface, to a retracted position for placing the plurality of blades in contact with the ground surface.

25. A method of mulching and cultivating valley portions adjacent crop rows of a sugar cane field which has had sugar cane harvested therefrom, wherein such harvesting resulted in fodder including cane stalks undesirably dispersed over the valley portions, the method comprising:
- attaching a frame to an agricultural traction vehicle adapted for moving the frame in a direction of travel along the crop row;
- fixedly attaching a first carriage to the frame at a preselected orientation to a second carriage attached to the frame;
- rotatably attaching a first drum to the first carriage for freely rotating about a first axis of rotation and a second drum to the second carriage for freely rotating about a second axis of rotation, each of the first and second drums having a rolling surface for engaging a ground surface above which the frame is, wherein the first carriage is in a spaced relation to the second carriage for straddling the crop row, thus permitting the first and second drums to freely roll on opposing sides of the crop row, the first and second drums each having a plurality of blades extending therefrom for penetrating the ground surface, wherein each of the plurality of blades is oriented at a non-zero angle to an axis of rotation of the drum sufficient for mulching and throwing ground material therefrom during rotation thereof, and wherein one non-zero angle for the first drum differs from a second non-zero angle for the second drum; and
- moving the frame along the direction of travel for mulching fodder in the ground surface portions at opposing sides of the crop row and cultivating the ground surface portions thereof.

26. The method according to claim 25, wherein the first and second carriages and drums, in combination, form a drum pair, and wherein one drum pair is carried at a forward portion of the frame and a second drum pair is carried at an aft portion of the frame, and wherein the blades carried within the one drum pair are arranged for throwing dirt toward a center of the frame while the blades carried within the second drum pair are arranged for throwing dirt toward sides of the frame.

27. The method according to claim 26, wherein the first non-zero angle is generally orthogonal to the second non-zero angle.

28. The method according to claim 26, further comprising setting the frame at a desired pitch, the desired pitch ranging between a forward pitch to an aft pitch of the frame for shifting weight onto the one drum pair and the second drum pair, respectively.

29. The method according to claim 25, further comprising filling each of the drums with a liquid for adding weight thereto.

30. The method according to claim 25, wherein each of the first and second non-zero angles range from approximately 40 degrees to approximately 50 degrees to an axis of rotation of the drum.

31. The method according to claim 25, further comprising sliding and rotating the first and second drums for providing a preselected orientation to the crop row operating thereon, and securing each of the first and second drums for rotation thereof at the preselected orientation.

32. The method according to claim 25, wherein a wheel assembly is rotatably carried by the frame for moving the wheel assembly from a transporting position wherein a wheel contacts the ground surface for transporting the frame with the cutting edges out of contact therewith, to a retracted position wherein the blades are placed in contact with the ground surface.

33. A method of mulching and cultivating an agricultural field, the method comprising:
  freely rotating a first drum about a first axis of rotation, the first drum having a first rolling surface for operating over a ground surface, the first drum having a plurality of blades extending therefrom for penetrating the ground surface, wherein each of the plurality of first blades is oriented at a first angle to the first axis of rotation;
  freely rotating a second drum about a second axis of rotation, the second drum having a second rolling surface for operating over the ground surface, the second drum having a plurality of second blades extending therefrom for penetrating the ground surface, wherein each of the plurality of second blades is oriented at a second angle to the second axis of rotation, wherein the first angle is generally orthogonal the second angle;
  straddling the first and second drums transversely across and proximate at least one crop row for permitting the first and second drums to freely roll on opposing sides of the at least one crop row; and
  rolling the first and second drums on the ground surface, the plurality of first blades mulching the fodder within a first ground portion on one side of the at least one crop row and shaping thereof with ground material from the first ground portion, the plurality of second blades mulching the fodder within a second ground portion on an opposing side from the first ground portion of the at least one crop row and shaping thereof with ground material from the second ground portion.

34. The method according to claim 33, wherein the first and second drums, in combination, form a drum pair, and wherein a forward drum pair is carried in a spaced relation along the direction of travel to an aft drum pair, each of the plurality of blades carried thereby oriented for dispersing dirt toward a desired direction during rotation thereof.

35. The method according to claim 34, further comprising adding weight to at least one drum within the forward and aft drum pairs.

36. The method according to claim 33, further comprising transversely sliding and rotating the first and second drums for providing a preselected orientation to the crop row operating thereon, and securing each of the first and second drums at the preselected orientation.

37. A method of mulching valley portions adjacent crop rows and cultivating an agricultural field harvested of its crop, wherein harvesting resulted in fodder including stalks undesirably dispersed over the valley portions, the method comprising:
  providing a plurality of first blades freely rotatable about a first axis of rotation, each of the plurality of first blades defined within a first plane;
  providing a plurality of second blades freely rotatable about a second axis of rotation, each of the plurality of second blades defined within a second plane;
  orienting each of the plurality of first blades at a first angle to the first axis of rotation, each of the plurality of second blades at a second angle to the second axis of rotation;
  positioning each of the plurality of first and second blades within first and second valley portions adjacent a crop row for straddling thereacross; and
  moving the plurality of first and second blades longitudinally along the crop row for freely rotating each of the plurality of first and second blades about the first and second axes of rotation, wherein rotating the plurality of first blades mulches fodder within the first valley portion and throws portions of ground material within the first valley in a first direction, and wherein rotating the plurality of second blades mulches fodder within the second valley portion and throws portions of ground material within the second valley in a second direction.

38. The method according to claim 37, wherein the axes of rotation are orthogonal to the crop row.

39. The method according to claim 37, wherein the axes of rotation are each at an acute angle to the crop row.

40. The method according to claim 37, wherein the first and second angles include acute angles to the first and second axes of rotation.

41. The method according to claim 37, wherein the first angle to the first axis of rotation is orthogonal to the second angle to the second axes of rotation.

42. The method according to claim 41, wherein the first and second direction cause the ground material to be thrown toward the crop row for shaping thereof.

43. The method according to claim 41, wherein the first and second direction cause the ground material to be thrown away from the crop row.

44. The method according to claim 37, wherein each of the plurality of first and second blades are radially extending from first and second rolling drum surfaces, respectively.

45. The method according to claim 44, wherein the plurality of first and second blades and first and second rolling drum surfaces, in combination, form a drum pair, and wherein a forward drum pair straddles the crop row in a spaced relation therealong to an aft drum pair, each of the plurality of blades carried thereby oriented for dispersing ground material toward a desired direction during rotation thereof.

* * * * *